Aug. 31, 1948. J. H. GOSS 2,448,367
DECELEROMETER
Filed June 19, 1945 2 Sheets-Sheet 1
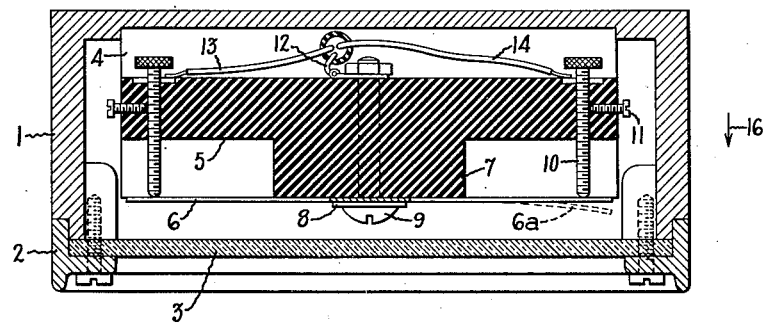
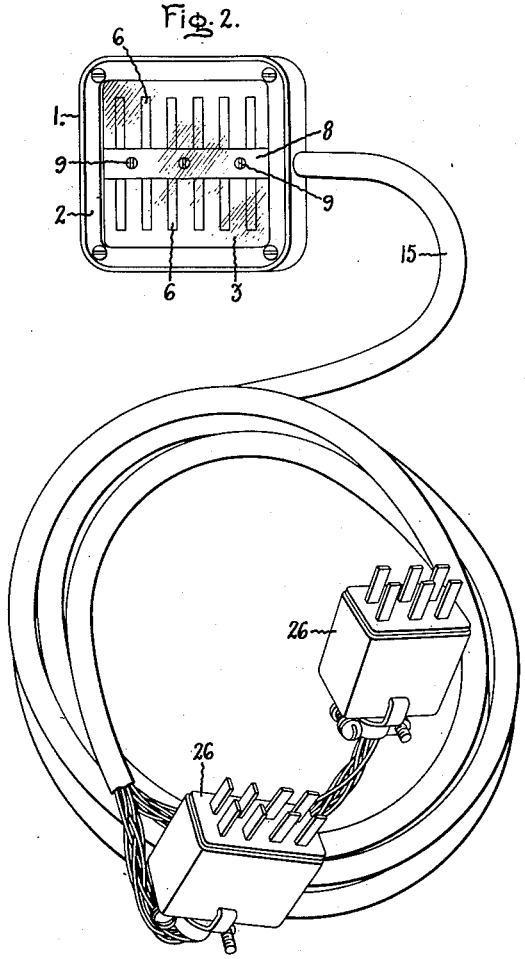
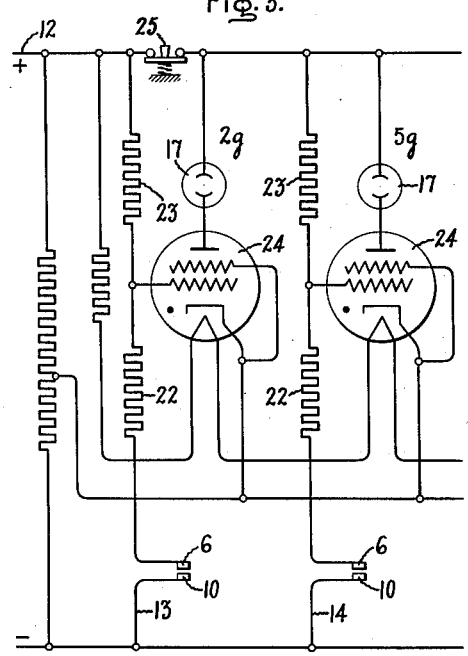
Inventor:
James H. Goss,
by Prowell P. Mack
His Attorney.

Aug. 31, 1948.  J. H. GOSS  2,448,367
DECELEROMETER
Filed June 19, 1945  2 Sheets-Sheet 2
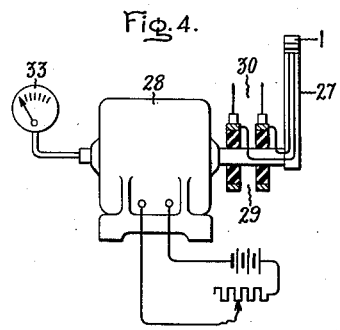
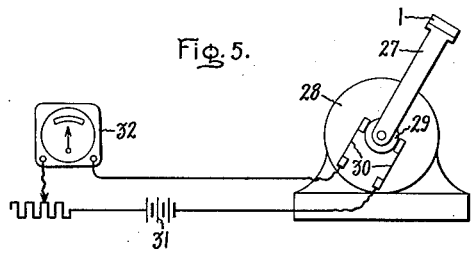
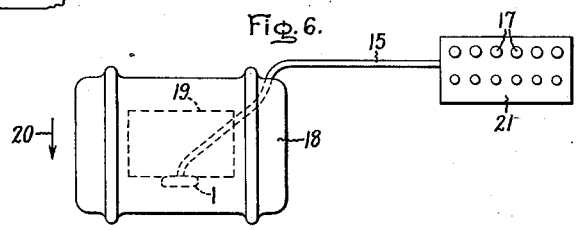
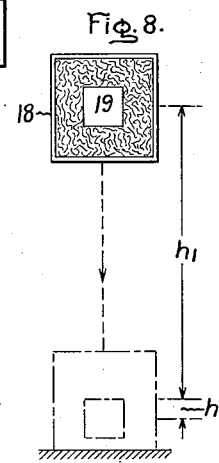
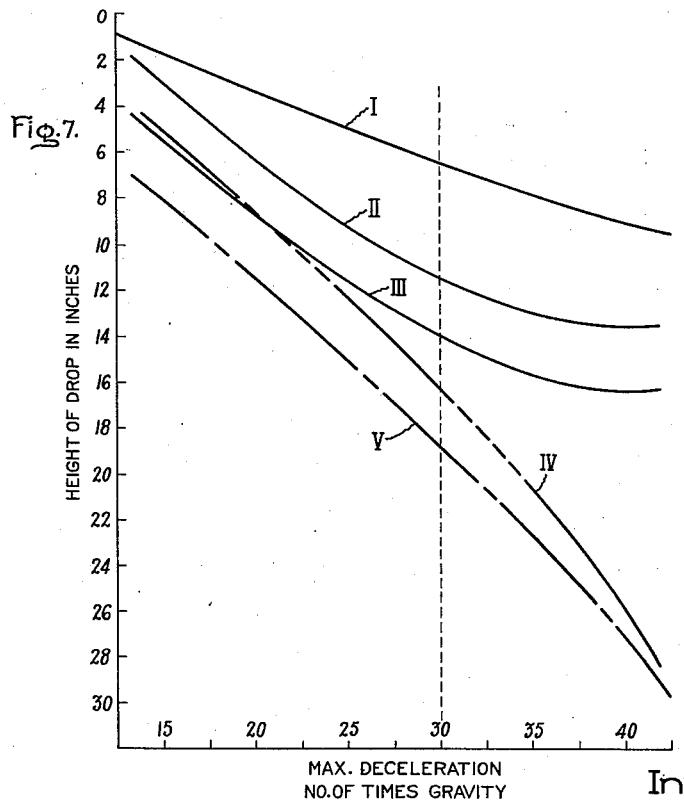
Inventor:
James H. Goss,
by Prowell P. Mack
His Attorney.

Patented Aug. 31, 1948

2,448,367

UNITED STATES PATENT OFFICE 2,448,367

DECELEROMETER

James H. Goss, Essex, Mass., assignor to General Electric Company, a corporation of New York Application June 19, 1945, Serial No. 600,380

1 Claim. (Cl. 73—12)

My invention relates to force measuring apparatus and in particular to a simple, low cost, easily calibrated decelerometer particularly adapted for testing the cushioning property of packing material.

It is generally recognized that various articles of commerce are likely to receive rough handling during transportation from the point of manufacture to the point of use, and that where the nature of the article is such as to be damaged by mechanical shock, it is important that it be packed in such a way as to be cushioned against damaging mechanical shocks during shipment if it is to arrive at its destination in a useful condition. The necessity of packing various types of apparatus to prevent damage in shipment adds expense not only for the cushioning or packing material but also for its container and the extra weight and particularly the additional shipping space required. Hence, simple means for easily evaluating the cushioning properties of various kinds and quantities of such packing material as actually used in different sizes and shapes of containers for shipping purposes become desirable, since by its judicious use adequate cushioning protection during shipment will be assured but without unnecessary expense or the use of unnecesarily large shipping containers. My invention provides a decelerometer particularly suited for this purpose, although it may be used for any purpose for which suited.

The features of my invention which are believed to be novel and patentable will be pointed out in the claims appended hereto. For a better understanding of my invention, reference is made in the following description to the accompanying drawing in which Fig. 1 represents a cross-sectional view through a decelerometer device embodying my invention. Fig. 2 represents a multiple unit decelerometer and its connecting cables ready to be included in a packing case for test purposes. Fig. 3 is a portion of a circuit diagram of an indicator system suitable for use with my invention. Figs. 4 and 5 are different views of a device for accurately calibrating the decelerometer of my invention. Fig. 6 indicates a multiple unit decelerometer unit in a packing case connected to indicators; Fig. 7 shows, by means of deceleration-drop distance curves plotted from data obtained by the use of my invention, the comparative cushioning properties of five different packing materials, and Fig. 8 represents the deceleration movement of an article in a packing container when the package is dropped.

Referring now to Figs. 1 and 2, Fig. 1 may be considered to be a cross section through the multiple unit decelerometer of Fig. 2 which consists of a suitable casing 1 having a cover closure 2 the portion 3 of which is represented as being transparent, although this is not essential. The casing is made of any suitable nonshatterable material. Part 3 may be made of transparent plastic. Securely held within the casing is a block 4 of insulating material having a T-shaped reduced section 5 between its ends on which are mounted a plurality of resilient metal tongue pieces 6 in two rows. These tongues are firmly held at their inner ends against the central part 7 of the reduced block portion 5 by an overlying strip 8 and bolts 9. The outer ends extend beyond the support 7 into free space except as biased by screws 10 threaded through the block part 5. The screws 10 are adjustable and if necessary may be locked in any adjusted position by set screws 11. The tongues 6 which are in alignment may be formed of a continuous strip of metal. The contacts between tongues 6 and the adjustable screws 10 form electrical contacts which are made or broken in the operation of the decelerometer as will be explained. A common wire 12 is connected to the fixed ends of all of the tongues through one of the bolts 9, and individual wires 13, 14, etc. connect to the several screws 10. These wires form a flexible cable 15 leading to a source of electric supply and indicating apparatus represented in Fig. 3.

The tongues 6 form cantilever springs and if the screws 10 be turned up so as to contact tongues 6 with more or less force and the device be dropped in the direction of the arrow 16 (Fig. 1) against a solid surface, tongues 6, due to the force of gravity and inertia, tend to continue the downward movement and if the forces be great enough, the free end will spring away from the screws 10 as indicated at 6a and open the corresponding circuit which contains a signal 17 (see Fig. 3), indicating that fact. If the assembly is turned on edge and moved sideways rapidly and is suddenly stopped, the deceleration force will be due to inertia alone; and if the assembly is turned over from the position represented in Fig. 1 and moved upward rapidly and suddenly stopped, the deceleration force will be due to inertia less gravity. By providing a number of the tongue or cantilevers 6 with their contacts and with the biasing force of the screws 10 adjusted and calibrated to open the contacts at predetermined different values of deceleration, it is possible to cover a wide range of deceleration values.

In the device represented in Fig. 2 there are twelve deceleration responsive springs 6 and as ordinarily used they will be adjusted to operate at suitable different values of deceleration or other outside force, such as acceleration, centrifugal force, etc.; for example, the several contacts may be adjusted to open their contacts when subjected to forces of 2, 5, 7, 10, 15, 20, 25, 30, 35, 40, 50, and 60 times gravity, respectively. In testing a packing container and its contents for shock, the decelerometer may be used as indicated in Fig. 6 where 18 represents a packing case such as a metal drum. An instrument of some character which is to be shipped in the packing case is indicated in dotted lines at 19. In most instances an equivalent weight may be substituted in place of the actual instrument during the test procedure. It is assumed that the instrument 19 is surrounded with packing material and the decelerometer 1 is fixed to the instrument 19 so as to be subject to the same deceleration forces. As indicated, the decelerometer is fixed to the bottom of instrument 1 with the spring 6 facing in the direction in which the packing case will be dropped in the testing procedure. For example, if the packing case is to be dropped in the direction indicated by arrow 20, the device 1 will be fastened to instrument 19 with the side shown facing the reader in Fig. 2 and downward in Fig. 1, facing in the same direction as the arrow 20. Device 1 may be fastened to instrument 19 in any suitable manner at top or bottom or inside, as convenience dictates, so long as both are secured firmly together and the device 1 faces in the proper direction. The multiple conductor flexible cable 15 extends out of the container 18 to the indicating panel 21 which will have in the case assumed twelve indicators 17, one for each spring contact member 6. Ordinarily the packing container will be dropped in the direction which is most likely to cause damage to the instrument 19. For example, if the instrument 19 is an artificial horizon gyroscope for use on airplanes, the part most likely to be damaged by shock will probably be one of its bearings, and the particular bearing most likely to be damaged will depend largely on the weight distribution and structure of the instrument. These facts and the weight of the instrument are readily ascertained and the shock tests are made accordingly. In some instances shock tests will be made for two or more different orientations of the instrument in the packing case. Different kinds and sizes of packing cases and different kinds and quantities of packing material will be tested until a combination is found in which the instrument may be shipped with reasonable safety and convenience at minimum expense, taking into consideration cost, size, shape, and weight of the packing container and packing material used. Tests are made by dropping the packing container onto a hard floor from different heights and noting the signals 17 which operate and damage, if any, to the instrument, the size and shape of container, nature of packing material, and any other factors which enter into the final selection.

The form of indicating apparatus which may be used is subject to a wide selection. Where the contacts between 6 and 10 are normally closed and open in response to deceleration, or other force to be measured, the indicating apparatus may be as represented in Fig. 3 where only two of the twelve indicating circuits are completely represented. Each set of contacts 6 and 10 of the decelerometer is connected across a suitable source of supply through voltage dividing resistances 22 and 23. The voltage between the resistances is connected to the control grid of a gas-filled tube 24. The tube 24 is connected across a suitable part of the supply voltage through the glow lamp signal 17 and a normally closed switch 25. Switch 25 may be common to all of the signal circuits as shown. When the contacts 10 and 6 are closed, the voltage on the control grid of the corresponding tube 24 is such as to hold the tube at cutoff. When the contacts 6 and 10 open as indicated at 6a, Fig. 1, the voltage on the grid of corresponding tube 24 is increased and the tube is fired, causing lamp 17 to glow. Lamp 17 continues to glow after contacts 6 and 10 are closed again until the tube is cut off by opening switch 25.

The various signals 17 will preferably be arranged in logical order and the panel 21 marked with the deceleration values, such as $2g$, $5g$, etc., to which the corresponding contacts 6 and 10 are set to respond. When any set of contacts 6—10 are opened in response to a deceleration measurement, all of those which are set to a lower value will also open so that all of the lamps 17 up to the one which indicates the measurement will glow. As soon as the maximum indication is noted, switch 25 may be opened momentarily to extinguish the lights preparatory to the next measurement operation.

The tubes 24 and their circuits and a battery source of supply may be housed in a portable box on which the lamp panel 21 is mounted, and connections by means of plugs 26, Fig. 2, may be made thereto through the flexible cable 15 to the decelerometer unit 1.

It is of course possible to have the contacts 6 and 10 of the decelerometer normally open instead of normally closed. This may be done by backing the screw contacts 10 away from the spring blades 6 at various distances. The decelerator unit would then be turned over and dropped in the opposite direction so that the contacts would close in response to different deceleration values. However, the manner of use first explained is preferred, as it is subject to more exact calibration. The device may of course be used to measure acceleration forces whether positive or negative.

A convenient way of calibrating the decelerometer unit 1 is to mount it on a pivoted arm 27, Figs. 4 and 5, of known length and rotate it at various measured speeds by a variable speed motor 28, and note at what speed the several contacts open and adjust them to correspond to definite values of centrifugal force corresponding to values of gravity. Gravity=32.2 feet per second per second. The decelerometer unit 1 is mounted on arm 27 with the contacts 6 tangent to the circle of rotation and outwardly of contacts 10 so that the contacts will tend to open due to centrifugal force. The pair of contacts 6—10 to be calibrated are connected through slip range 29, brushes 30 to a source of supply 31 and any suitable indicator such as an ammeter 32. When the contacts 6—10 are closed continuously, the instrument current may be adjusted so as to give a full scale instrument reading. The motor 28 is started and its speed increased until a decreased reading of the ammeter indicates the opening of the contacts. It has been found that at a given speed the contacts will be opened during the upper one-half revolution of arm 27 when gravity is opposed to the centrifugal force and closed during the lower one-half revolution of arm 27 when gravity is added to the centrifugal force. At such speed the ammeter circuit is open one-half the time and closed one-half the time and reads at one-half scale value. This gives a very convenient method of determining the exact speed corresponding to the setting of the contacts. The corresponding speed of rotation is measured with an accurate tachometer indicated at 33. The deceleration value at which the contacts are set is computed from the expression:

$$\text{Deceleration} = \frac{(2\pi \times RN)^2}{32.2 R} = 1.235 \, RN^2$$

where $R$ = distance from center of rotation to the cantilever spring arm 6 of device 1 in feet,
$N$ = revolutions per second, and Deceleration = number of times the acceleration of gravity (32.2 in the expression=gravity, designated $g$) in feet per second per second at the earth's surface.

In this way the several springs 6 are set at the desired values of gravity, such as $2g$, $5g$, etc. For instance, if the value is too low in any case, the spring tension is increased by turning up contact screw 10. From the method of calibration described it will be evident that the device may be used for measuring speed, centrifugal force, etc.

In the use of the decelerometer for testing packing containers, it is assumed that the outside container 18, Fig. 6, will have sufficient strength to withstand a normal amount of rough handling, and that safety of the instrument 19 or other contents is the primary consideration. If the package 18 is dropped one foot ($h_1$, Fig. 8) and the cushioning material between the instrument 19 and the outside container walls allows the instrument to move one inch ($h_2$, Fig. 8) relative to the container before it comes to rest, with the resistance to such movement increasing directly proportional to the movement, the average deceleration may be expressed:

$$\text{Average deceleration} = \frac{\text{Height of fall} \times g}{\text{Movement of device}}$$

Substituting:

$$\text{Average deceleration} = \frac{1 \text{ foot} \times g}{\frac{1}{12}g} = 12_g$$

where $g$ is the acceleration of gravity, or 32.2 feet per second per second. The peak or maximum deceleration does the damage and this is twice the average deceleration. Therefore the instrument 16 or other apparatus must be able to withstand 2 ($12_g$), or $24_g$ if the movement of one inch in the package assumed is adequate for a one-foot dropping distance. The package may now be dropped at various increasing distances to measure the cushioning performance of the packing material at higher values of deceleration. The measurements are obtained from the indication of the gravity calibrated lamp indicators by noting the lamp having the highest calibration which lights up in each case.

Fig. 7 is a series of deceleration-drop distance curves obtained in determining the relative merits of different sizes of packing cases and different kinds of packing material for shipping an artificial horizon gyroscope instrument weighing approximately seven pounds. The ordinates represent height of drop in inches corresponding to $h_1$, Fig. 8, and the abscissas represent maximum deceleration in terms of the number of times gravity as measured by my decelerometer as calibrated and used as previously described. The nature of the container and type of packing materials used for the five curves were as shown in the following table.

| Curves | Container | Packing material |
|---|---|---|
| 1 | 10-inch diameter can | Mixture of latex and tulla fiber. |
| 2 | Corrugated carton | 2 inches of shredded vegetable parchment around instrument. |
| 3 | 10-inch corrugated carton. | Corrugated pig bristle and latex. |
| 4 | Corrugated carton | 4 inches of shredded vegetable parchment around instrument. |
| 5 | 14-inch diameter can | Mixture of latex and tulla fiber. |

If it be assumed from calculation, tests, or actual experience that $30g$ is the maximum deceleration that the instrument can stand without injury, it is seen from these curves that curve I permits of a drop of about six inches before damage will result; curve II allows for a drop of about 11 inches; curve III about 14 inches; curve IV, 16 inches; and curve V about 19 inches. If shipping requirements call for packaging capable of giving adequate protection to the instrument if its packing container is dropped a distance up to one foot on a hard surface or the equivalent, it is seen that packages corresponding to curves III, IV and V qualify but those corresponding to curves I and II do not. The package of curve I gives the least protection, while that of curve V gives the most. It is further noted that curves II and III become horizontal for deceleration values of slightly less than $40g$. This shows that the instrument has bottomed in its container at these points on these curves or, in other words, the cushioning effect of the packing material is all used up and is solidly compressed between the instrument and bottom wall of the container.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

Decelerating force measuring apparatus comprising a support, a plurality of switches mounted on said support each having an adjustable rigid stationary contact and a lightweight resilient movable contact, with the movable contact biased against the stationary contact by reason of the resiliency of said resilient contact, the amount of such bias being adjustable by adjustment of the rigid contact, all of said switches being adapted to be opened in the same direction by the application of decelerating forces acting solely upon the mass of the lightweight resilient contact members in opposition to the resilient bias of such contact members whereby the apparatus may be kept relatively small and light but used for the measurement of relatively high deceleration force values, the tension of said resilient contact members being progressively different by reason of the different adjustments of the stationary contacts and of values calibrated in known terms of the deceleration forces necessary to open the corresponding switches, means controlled by each of said switches for producing an indication of its opening operation and maintaining said indication until reset, and means for resetting said indication producing means.

JAMES H. GOSS.

REFERENCES CITED

The following references are of record in the file of this patent:

UNITED STATES PATENTS

| Number | Name | Date |
| --- | --- | --- |
| 2,053,436 | Knowles | Sept. 8, 1936 |

FOREIGN PATENTS

| Number | Country | Date |
| --- | --- | --- |
| 637,939 | France | Nov. 24, 1926 |